United States Patent
Mori

(10) Patent No.: US 6,172,991 B1
(45) Date of Patent: Jan. 9, 2001

(54) ATM NETWORK WITH A FILTERING TABLE FOR SECURING COMMUNICATION

(75) Inventor: Naoki Mori, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/024,101

(22) Filed: Feb. 17, 1998

(30) Foreign Application Priority Data

Feb. 14, 1997 (JP) .................................................. 9-030436
Jul. 9, 1997 (JP) .................................................. 9-183665

(51) Int. Cl.$^7$ .............................. H04L 12/28; H04Q 3/00
(52) U.S. Cl. ......................... 370/474; 370/395; 370/389; 370/467
(58) Field of Search .................................... 370/389, 392, 370/395, 397, 400, 409, 465, 466, 467, 474

(56) References Cited

U.S. PATENT DOCUMENTS

| | | | |
|---|---|---|---|
| 5,425,026 | * | 6/1995 | Mori ..................................... 370/395 |
| 5,600,643 | * | 2/1997 | Robrock, II .......................... 370/399 |
| 5,884,025 | * | 3/1999 | Baehr et al. .......................... 370/401 |

FOREIGN PATENT DOCUMENTS

| | | |
|---|---|---|
| 0740442 | 10/1996 | (EP) . |
| 2301985 | 12/1996 | (GB) . |
| 6-152634 | 5/1994 | (JP) . |
| 8-274815 | 10/1996 | (JP) . |
| 9-275404 | 10/1997 | (JP) . |
| 9-307580 | 11/1997 | (JP) . |
| 9703189 | 1/1997 | (WO) . |

OTHER PUBLICATIONS

Kazuyoshi Hayase et al., "A Study on Regional Communication Network System based on ATM", *Shingaku Sotai*, B-7-124, Mar. 1997, p. 253.

Gen-ichi Nishio et al., "Group Communication Security on Regional PC Communication Network", *Shingakuron*, vol. J80-B-I, No. 6, Jun. 1997, pp. 366–374.

ATM Forum: Technical Committee, ATM Forum/96-0824r9, "MPOA Baseline Version 1", Sep. 3, 1996, pp. 1–53.

* cited by examiner

*Primary Examiner*—Chi H. Pham
*Assistant Examiner*—Frank Duong
(74) *Attorney, Agent, or Firm*—Sughrue, Mion, Zinn, Macpeak & Seas, PLLC

(57) ABSTRACT

In a communication system, a source node responds to a packet by transmitting a signaling message to an ATM network, containing source and destination network-layer addresses and source and destination transport-layer addresses of the packet. The ATM network includes a filtering table having a plurality of entries each storing source and destination network-layer addresses and source and destination transport-layer addresses. Upon receipt of the signaling message, the ATM network returns a grant indication message to the source node if contents of the received signaling message are identical to contents of one of the entries of the filtering table, and establishes a virtual connection between the source node and a destination node. The source node is responsive to the grant indication message for storing the network-layer addresses and transport-layer addresses of the received packet into a virtual connection management table, segments a subsequently received packet into cells and transmits the cells over the virtual connection if the packet contains addresses identical to the addresses stored in the virtual connection management table.

15 Claims, 16 Drawing Sheets

SOURCE IP NODE

ATM NODE

DESTINATION IP NODE

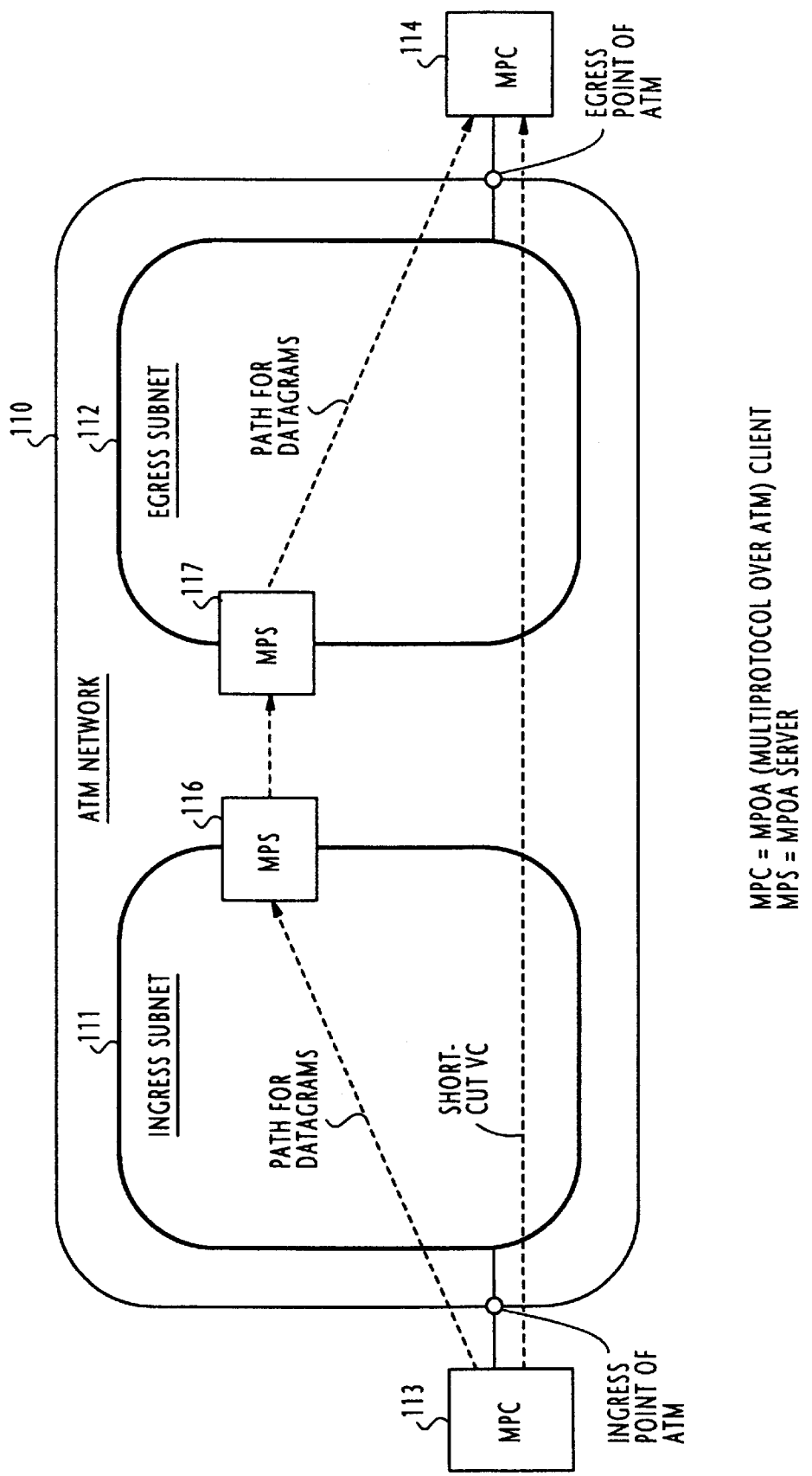

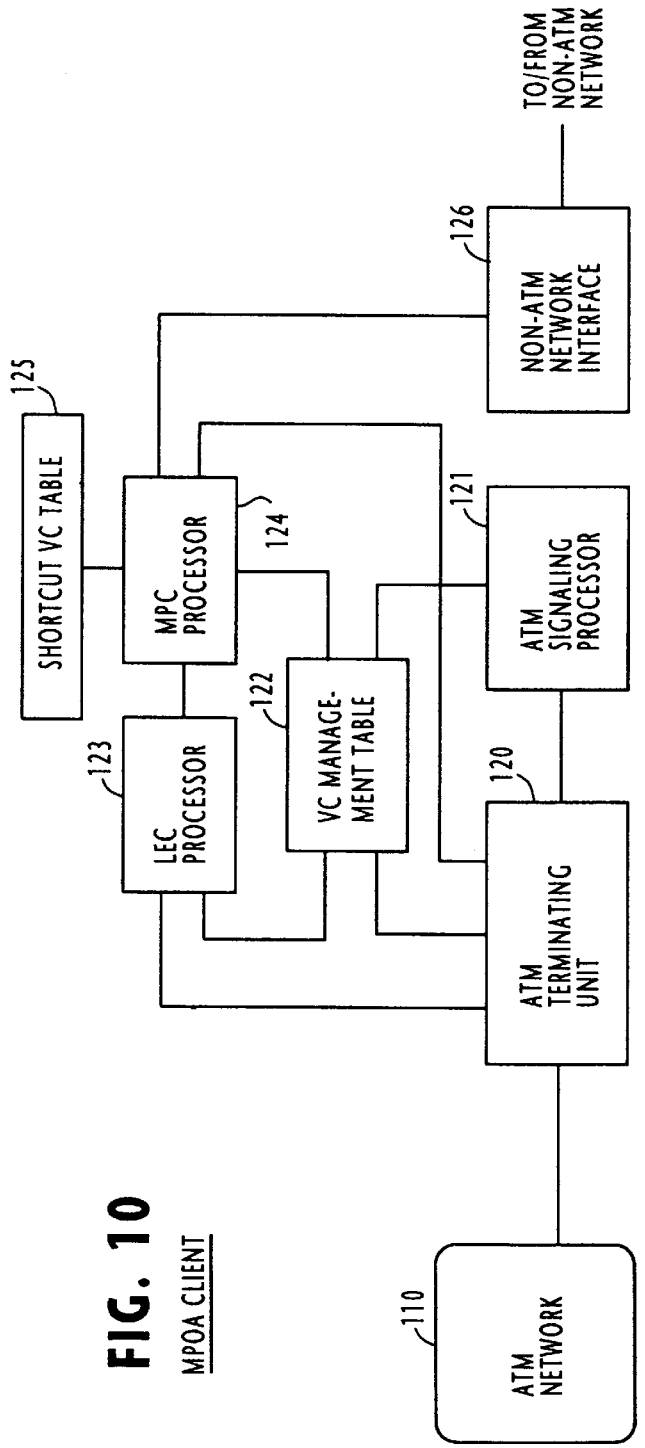

MPOA SERVER

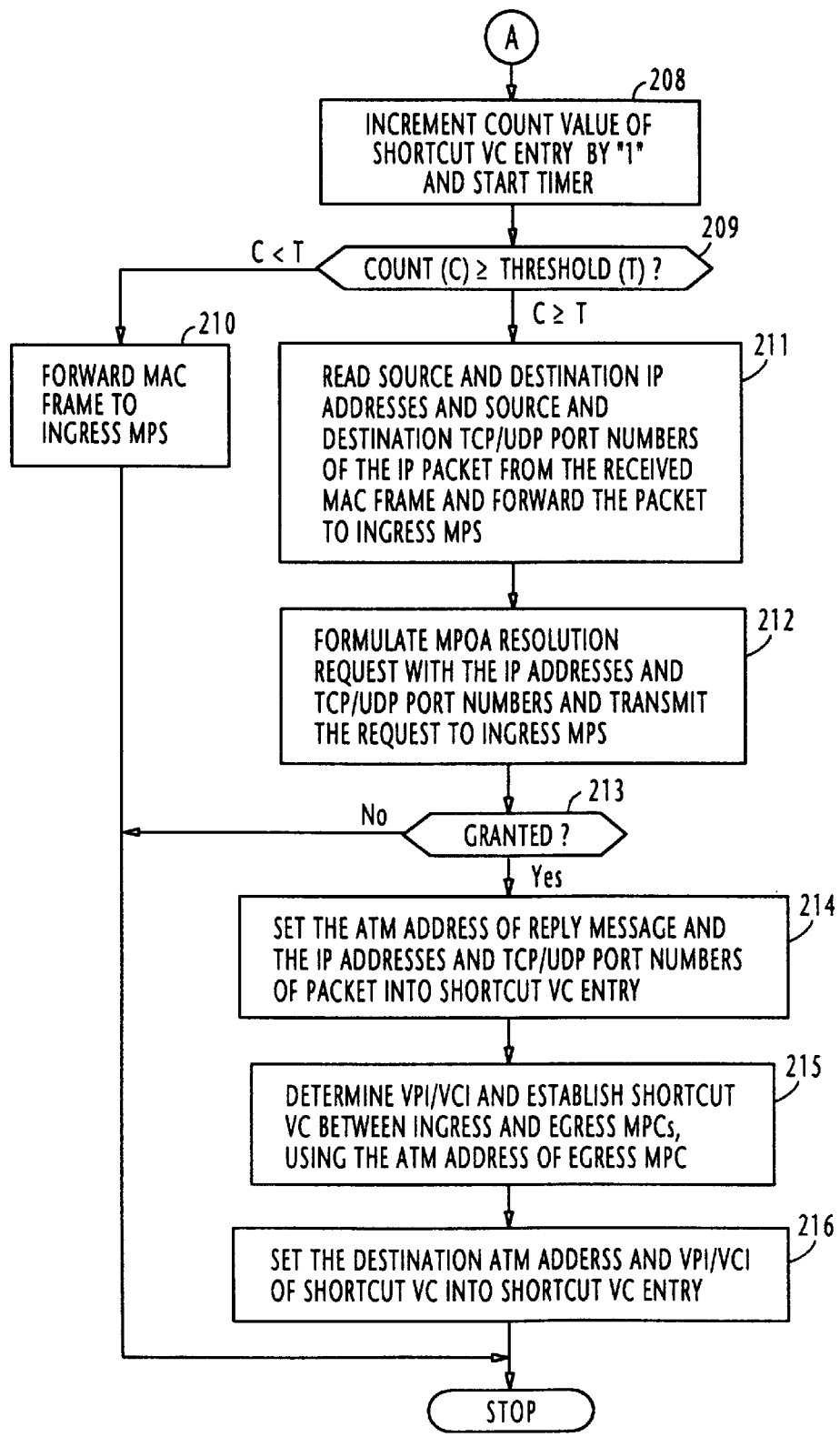

INGRESS MPC

INGRESS MPC

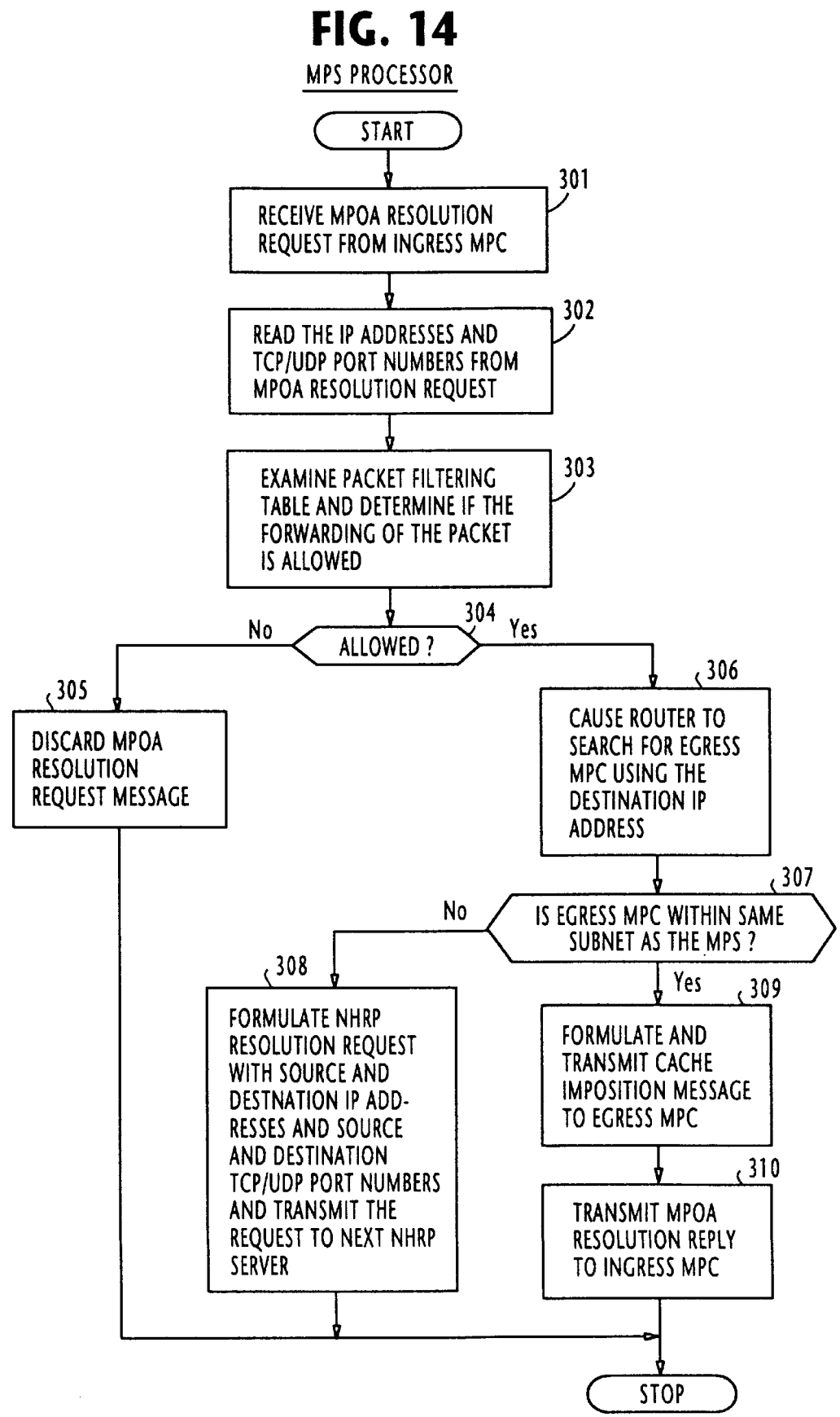

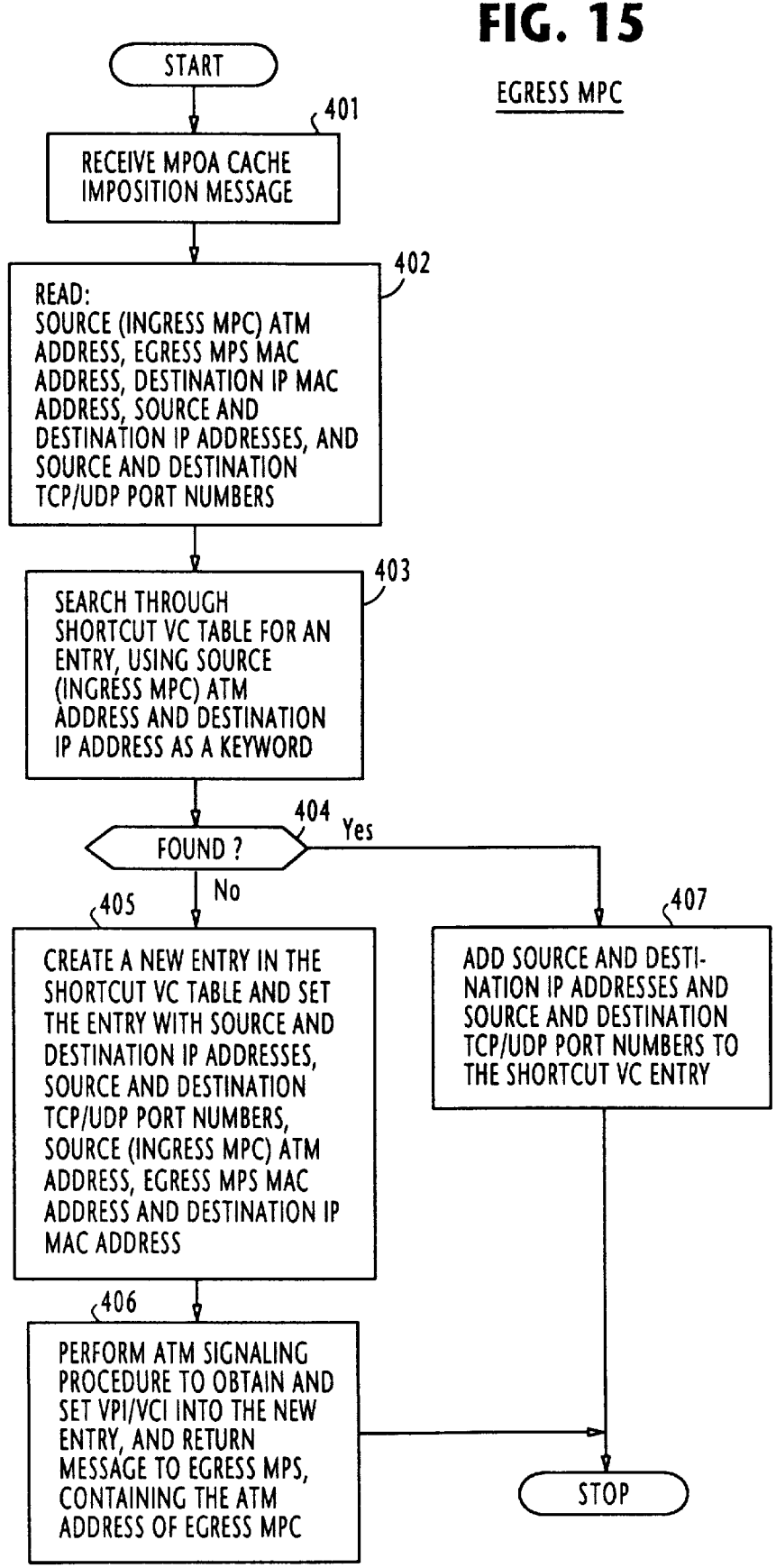

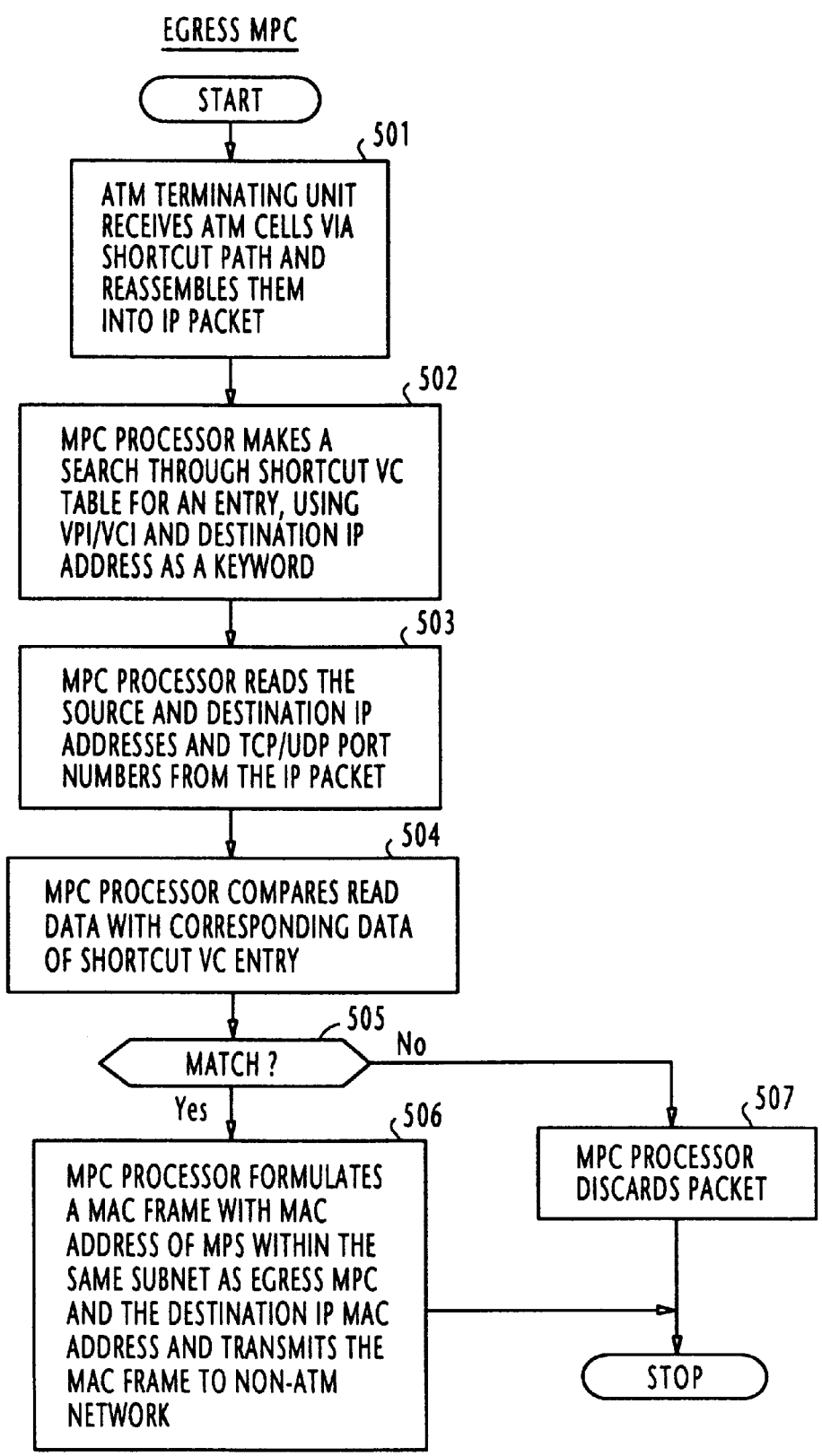

US 6,172,991 B1

ATM NETWORK WITH A FILTERING TABLE FOR SECURING COMMUNICATION

BACKGROUND OF THE INVENTION

1. Field of the Invention

The present invention relates generally to asynchronous transfer mode (ATM) networks, and more specifically to a secure Internet communication using TCP(transmission control protocol/IP (Internet protocol) protocol over ATM networks.

2. Description of the Related Art

In a communication system using TCP/IP protocols over an ATM network, the IP protocol is used as a network-layer protocol and the TCP/UDP protocol is used as a transport-layer protocol for routing packets and these protocol functions are provided by routers. Usually, the router has a number of network interfaces and handles processes up to the network layer. Some routers handle part of the transport layer. One of the functions of the router is the technique known as "packet filtering" to ensure security of communication at the edge of a network. When an IP node outside of a network wishes to communicate with an IP node inside the network, the router examines every arriving packet by reading the headers of the network and transport layers to determine whether the packet is allowed or discarded. Specifically, the IP addresses and TCP (UDP, i.e., user datagram protocol) port numbers of those IP nodes that are allowed are set into the router and the network and transport addresses of every incoming packets are checked against the stored data to determine accessibility to internal nodes. Depending on the layer at which filtering occurs, packet filtering is classified as network-layer filtering or transport-layer filtering.

On the other hand, communications system specified by the ATM Forum and IETF (Internet Engineering Task Force) use ATM as the second layer of the OSI (Open System Interconnection) reference model and the TCP/IP protocol as the third and fourth layers of the OSI reference model. Studies currently undertaken include the use of NHRP (next hop resolution protocol) scheme and MPOA (multiprotocol over ATM) system, where high speed ATM switches are provided, instead of conventional routers. ATM switches use a signaling procedure to establish a virtual connection between source and destination IP nodes prior to the transmission of transport-layer (TCP/UDP) packets. These packets are segmented into fixed-length cells at the source IP node and transmitted over the established virtual connection and reassembled at the destination IP node into a TCP/UDP packet.

However, since the TCP/UDP and IP headers of cells are not examined by transit switches as they propagate through the ATM network, the router's packet filtering function at the network-layer and transport-layer levels is not performed. Therefore, a need exists for ATM communication systems where security is a critical problem.

SUMMARY OF THE INVENTION

It is therefore an object of the present invention to provide an ATM network having a packet filtering function to ensure security of communication.

According to a first aspect of the present invention, there is provided a communication system comprising a source node for receiving a packet and transmitting a signaling message to an ATM network, containing source and destination network-layer addresses and source and destination transport-layer addresses of the packet. The source node has a virtual connection management table. The ATM network includes a filtering table having a plurality of entries each storing source and destination network-layer addresses and source and destination transport-layer addresses. The ATM network responds to the signaling message from the source node by returning a grant indication message thereto if contents of the received signaling message are identical to contents of one of the entries of the filtering table, and establishes a virtual connection between the source node and a destination node. The source node is responsive to the grant indication message for storing the network-layer addresses and transport-layer addresses of the packet into the virtual connection management table, segmenting a subsequently received packet into cells and transmits the cells over the virtual connection if the packet contains addresses identical to the addresses stored in the virtual connection management table.

According to a second aspect, the present invention provides a multiprotocol over ATM (MPOA) system comprising an MPOA client and an MPOA server. The MPOA client is provided with a shortcut virtual connection (VC) table having a plurality of entries, and arranged to receive a packet and transmit an address resolution request message containing source and destination network-layer addresses and source and destination transport-layer addresses of the packet. The MPOA server is provided with a filtering table having a plurality of entries each storing source and destination network-layer addresses and source and destination transport-layer addresses. The MPOA server is responsive to the address resolution request message for transmitting a resolution reply message back to the MPOA client containing an ATM address of a destination if contents of the resolution request message are identical to contents of one of the entries of the filtering table. The MPOA client is responsive to the resolution reply message for storing the ATM address of the reply message and the network-layer addresses and transport-layer addresses of the packet into the shortcut VC table to establish a shortcut virtual connection to the destination, and forwards a subsequently received packet over the shortcut virtual connection if the packet has addresses identical to contents of one of the entries of the shortcut VC table.

BRIEF DESCRIPTION OF THE DRAWINGS

The present invention will be described in further detail with reference to the accompanying drawings, in which:

FIG. 9 is a schematic block diagram of an MPOA (multiprotocol over ATM) system for incorporating the packet filtering function of the present invention;

FIG. 10 is a block diagram of an MPC (MPOA client) of the MPOA system;

FIG. 11A shows data to be set into the shortcut virtual connection (VC) table of the MPC when it operates as an ingress (source) MPC;

FIG. 11B shows data to be set into the shortcut VC table when the MPC operates as an egress (destination) MPC;

FIGS. 13A to 13D are flowcharts of the operation of an ingress MPC;

FIG. 14 is a flowchart of the operation of an MPS;

FIG. 15 is a flowchart of the operation of an egress MPC when it receives an MPOA cache imposition message from an MPS located within the same subset as the egress MPC; and FIG. 16 is a flowchart of the operation of the egress MPC when it receives ATM cells via a shortcut VC path.

DETAILED DESCRIPTION

Figure 1:
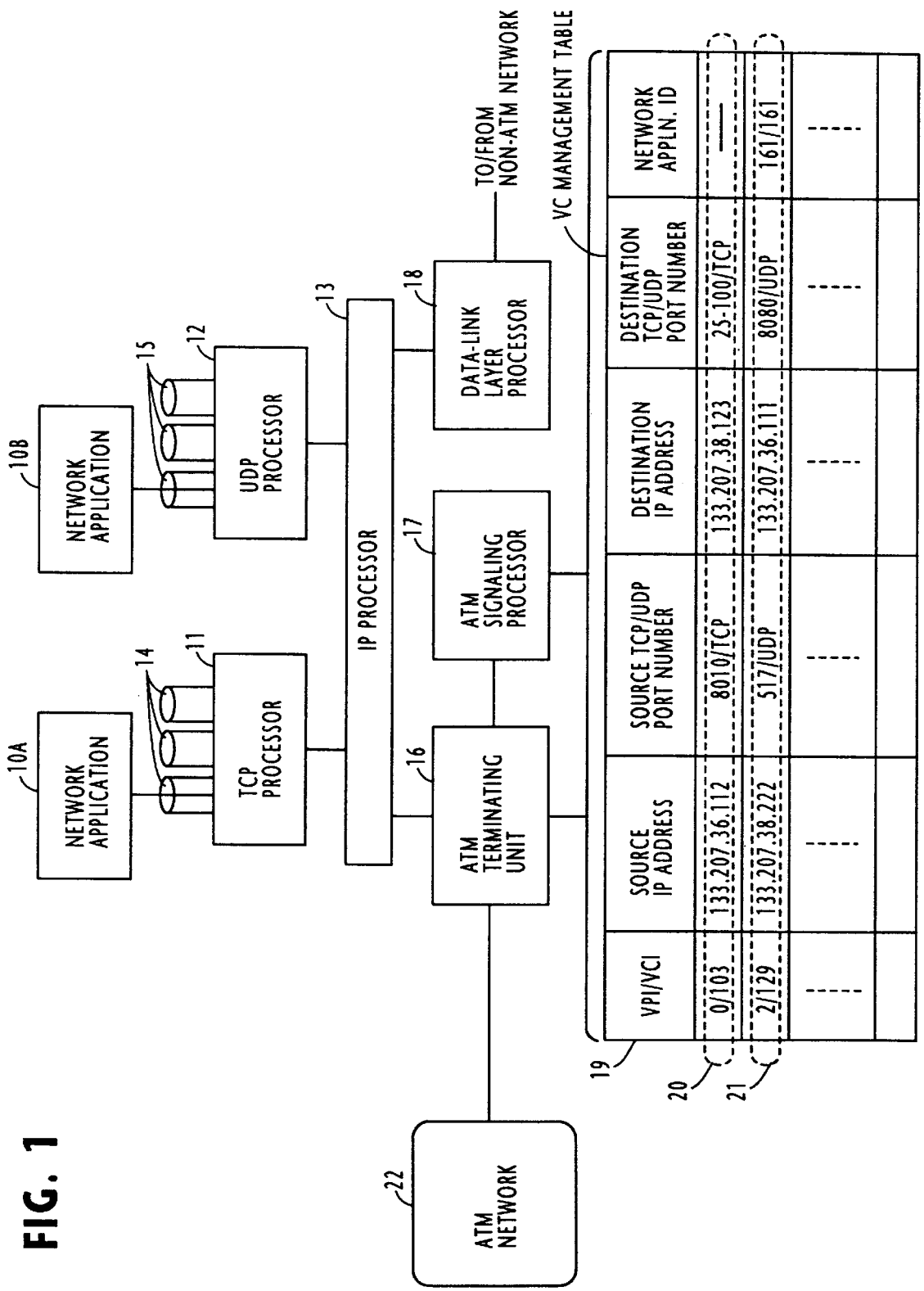
FIG. 1 is a block diagram of an IP node of the present invention.

Referring now to FIG. 1, there is shown an IP node of the present invention. The IP node includes a TCP processor 11 having TCP ports 14 and a UDP processor 12 having UDP ports 15. These ports serve as communication interfaces to enable network applications 10A, 10B to use the TCP and UDP protocols, respectively. Each of the ports is assigned a unique port number. The TCP and UDP processors 11, 12 are connected to an IP processor 13, the TCP, UDP and IP protocol functions are performed respectively by the TCP, UDP and IP processors. An ATM terminating unit 16 is provided between the IP processor 13 and the ATM network 22. The terminating unit 16 provides segmentation of a packet from the IP processor 13 into ATM cells and reassembly of cells from the ATM network into cells. A data-link layer processor 18 is connected between the IP processor 13 and a non-ATM network. An ATM signaling processor 17 is associated with a VC (virtual connection) management table 19 to set up data necessary for establishing a virtual connection only if the connection is allowed by the ATM network. When a packet is received from the IP processor 13, the terminating unit 16 looks up the management table 19 and determines whether a virtual channel has already been established for the received packet. If no virtual connection is established for the packet, the terminating unit 16 cooperates with the signaling processor 17 and sends a signaling message to the ATM network to establish a virtual connection to a destination IP node. When data cells are received from the ATM network 22, the terminating unit 16 reassembles them into a packet and looks up the VC management table 19 to determine if the packet is to be passed on to the IP processor 13 or discarded.

The VC management table 19 has a plurality of entries corresponding to virtual connections, with each entry having fields for storing VPI/VCI (virtual path identifier/virtual channel identifier), source IP address, source TCP/UDP port number, destination IP address, destination TCP/UDP port number and network application identifier. Entry 20 defines a virtual connection identified by VPI=0 and VCI=103 which is established between a source entity identified by IP address 133.207.36.112 and TCP port number 8010 and a destination entity identified by IP address 133.207.38.123 and TCP port numbers 25 to 100. No network application identifier is specified in entry 20. Entry 21 defines a virtual connection identified by VPI=2 and VCI=129 which is established between a source entity identified by IP address 133.207.38.222 and UDP port number 517 and a destination entity identified by IP address 133.207.36.111 and UDP port number 8080, with a source network application identifier 161 and a destination network application identifier which is of the same value as the source site.

Figure 2:
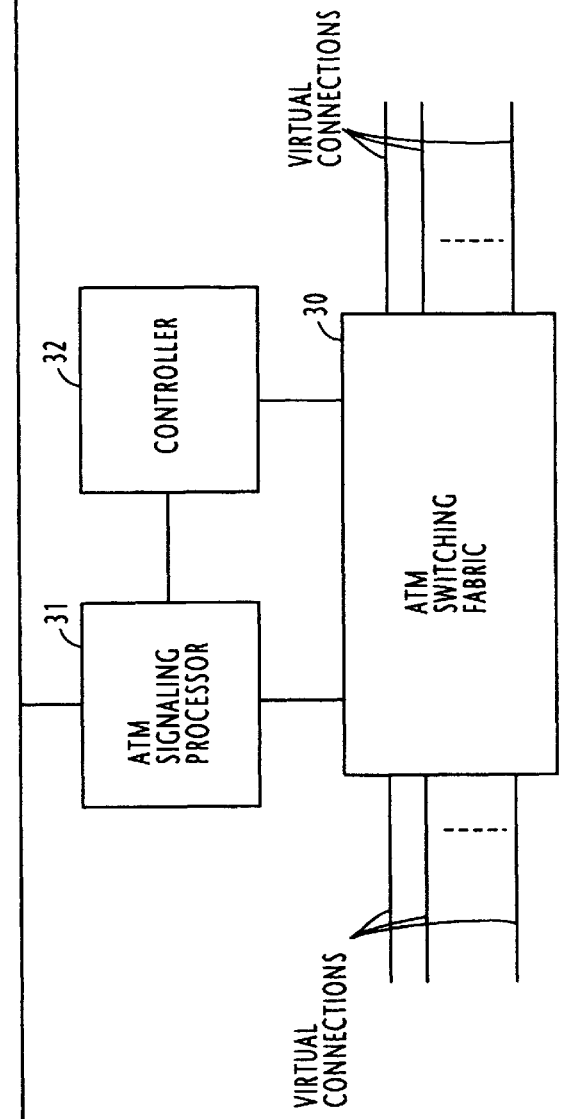
FIG. 2 is a block diagram of an ATM node of the present invention.

The ATM network comprises a number of ATM nodes interconnected by transmission lines and one of the ATM nodes is connected to the IP node of FIG. 1. As shown in FIG. 2, the ATM node comprises a switching fabric 30, an ATM signaling processor 31, a controller 32 and a filtering table 33.

The purpose of the filtering table 33 is to restrict virtual connections which can be established by indicating, in respective entries, those to be allowed and those to be rejected. Each entry of the filtering table has a plurality of fields for storing source IP address, source TCP/UDP port number, destination IP address, destination TCP/UDP port number, network application identifier and allowed/rejected indication. As an example, entry 34 defines an allowed virtual connection between a source IP node identified by IP address 133.207.36.112 and a destination IP node identified by IP address 133.207.38.123 and TCP port numbers 25 to 100. Entry 35 also defines an allowed virtual connection between a source IP node identified by IP address 133.207.38.222 and UDP port number 517 and a destination IP node identified by IP address 133.207.36.111 and UDP port number 8080. Entry 36 defines an allowable connection between all source IP nodes identified by IP address 133.207.38.0 and a destination IP node identified by IP address 133.207.38.0 and TCP port numbers 20 and 21 if they use the same network application identified by identifier 161. Entry 37 defines virtual connections which are rejected. In this case, virtual connections between all source IP nodes identified by IP address 133.207.36.0 and all destination IP nodes identified by IP addresses other than 132.207.0.0 are not allowed.

When the ATM signaling processor 31 receivers a signaling message from a source IP node, requesting a virtual connection, it reads the address information the message contains and makes a search through the filtering table 33 for the same address information and returns a response indicating that the request is granted if an allowed indication is given in the corresponding entry or the request is denied if a rejected indication is given in that entry. If the allowed indication is given to a connection setup request message, controller 32 is informed of this fact and controls the ATM switching fabric 30 to establish a virtual connection using the data stored.

The operation of the IP and ATM nodes of FIGS. 1 and 2 will be explained in detail with the aid of the flowcharts of FIGS. 3, 4 and 5. Note that the description is concerned with the set up of virtual connections only in one direction of transmission.

Figure 3:
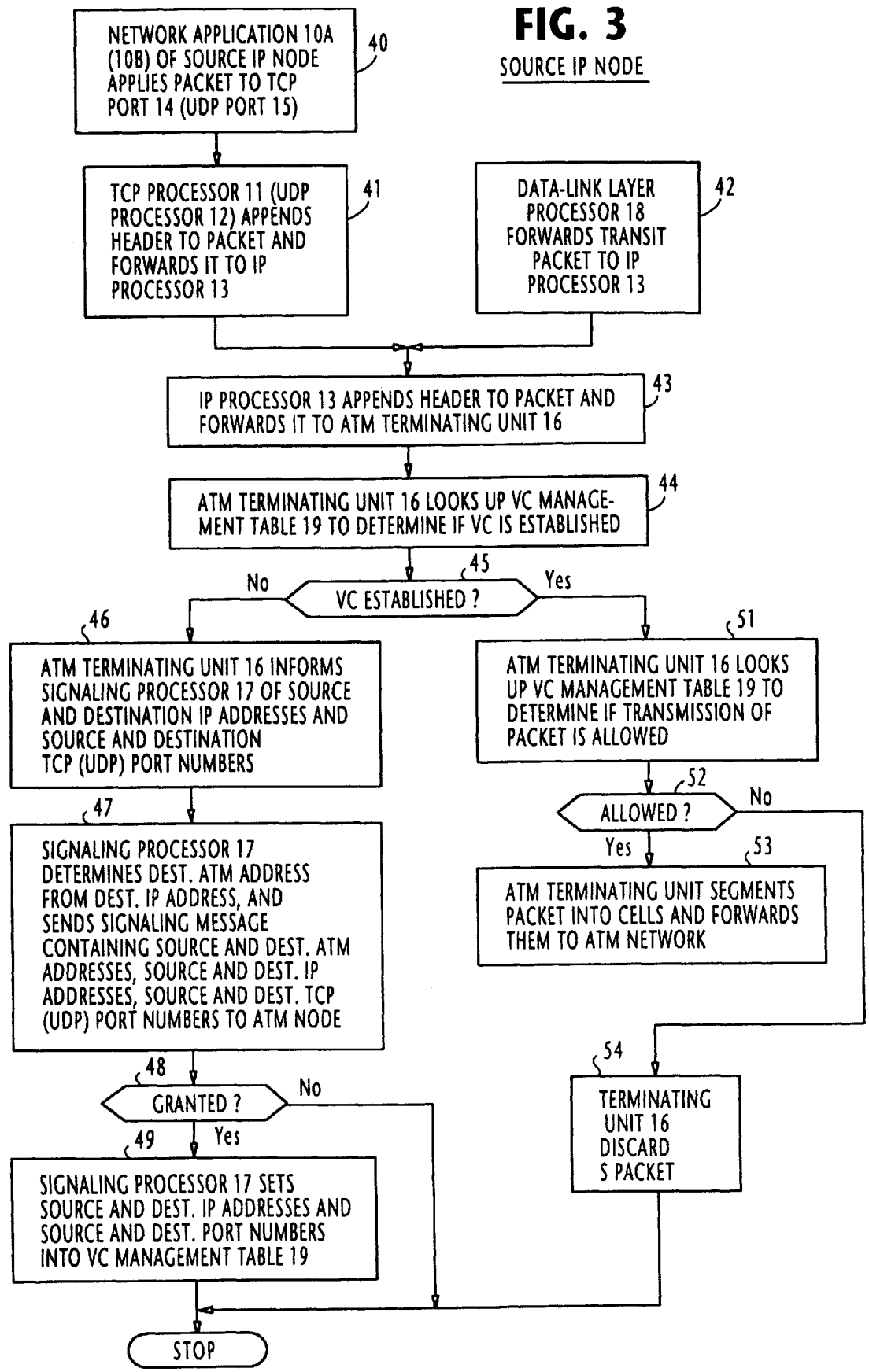
FIG. 3 is a flowchart of the operation of the IP node as a source node during connection setup and data transfer phases according to a first embodiment of this invention.

In FIG. 3, when network application 10A (10B) hands a packet to the associated TCP port 14 (UDP port 15) at step 40, the TCP processor 11 (UDP processor 12) appends a TCP (UDP) header to the packet and forwards it the IP processor 13 (step 41). The IP processor 13 inserts an IP header to the packet and forwards it to the ATM terminating unit 16 (step 42). If the data-link layer processor receives a packet from the non-ATM network that is destined to an IP node attached to the ATM network, it is forwarded to the IP processor 13, a header is inserted (step 42) and then forwarded to the terminating unit 16.

At step 43, the ATM terminating unit 16 reads the TCP (UDP) header and the IP header of the packet and makes a search through the VC management table 19 to determine whether a virtual connection has already been established for the packet (step 44). If the terminating unit 16 determines that a virtual connection is still not established (step 45), it informs the ATM signaling processor 17 of the IP addresses of source and destination IP nodes and source and destination TCP (UDP) port numbers along with the identifiers of network applications used at both source and destination sites (step 46).

Using these data from the terminating unit, the ATM signaling processor 17 invokes a signaling procedure to establish a virtual connection (step 47). Specifically, it makes a search through a memory for the ATM address of the destination IP node and sends a signaling message to the ATM network, containing the ATM addresses of the source and destination IP nodes, their IP addresses and TCP (UDP) port numbers as well as the identifiers of the network applications used by both source and destination.

Figure 4:
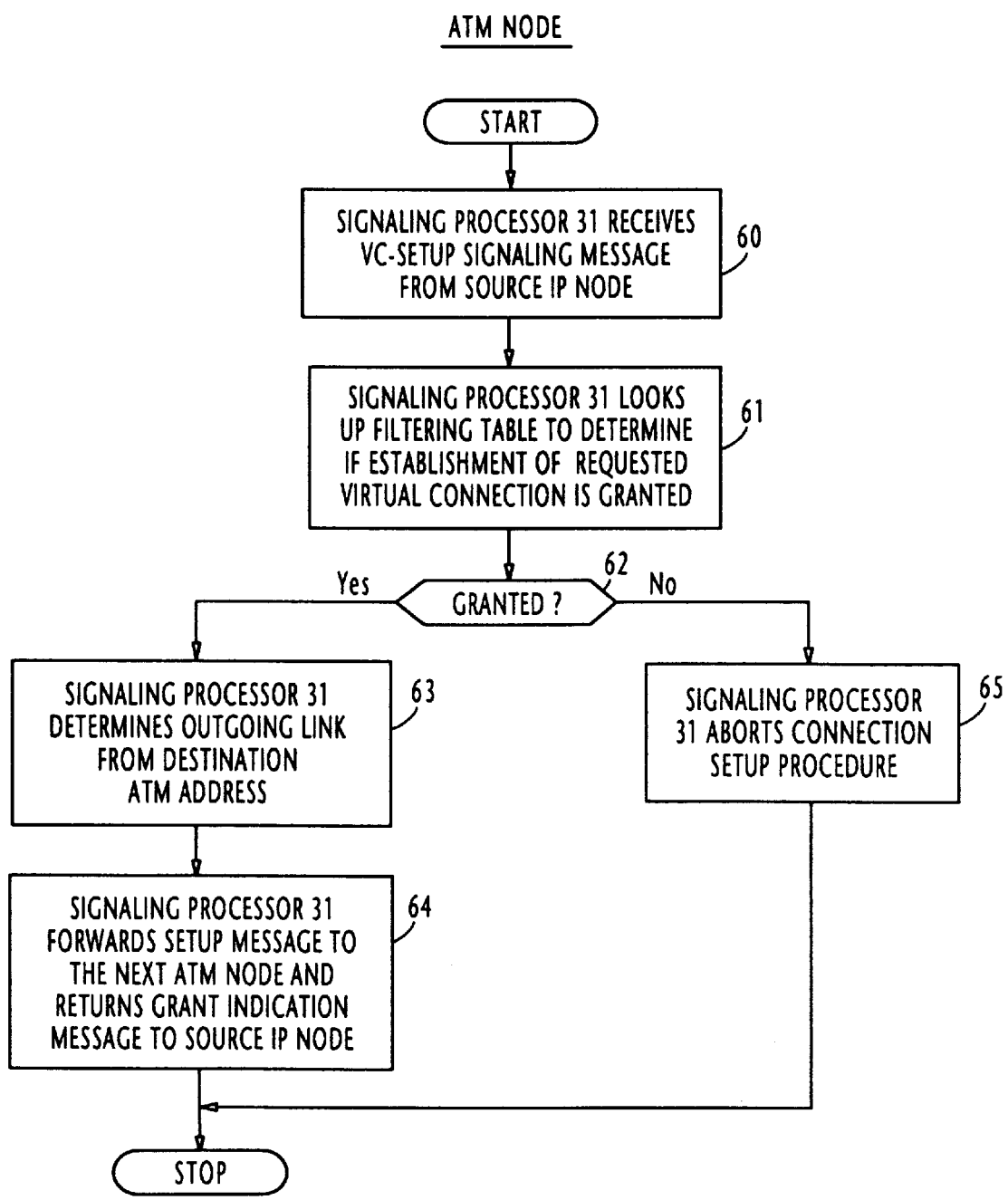
FIG. 4 is a flowchart of the operation of the ATM node during the connection setup phase according to the first embodiment of this invention.

At the ATM node, the signaling processor 31 receives the VC-setup signaling message from the source IP node (step 60) as shown in FIG. 4. The signaling processor 31 determines an outgoing link by using the destination ATM address contained in the received message (step 61) and then looks up, at step 62, the filtering table 33 to determine if the establishment of the requested virtual connection is to be granted or not. If the setup request is granted (step 62), the signaling processor 31 determines an outgoing link by using the destination ATM address contained in the received message (step 63) and forwards the connection setup signaling message to the next ATM node and returns a grant indication message to the source IP node (step 64). If the request is not granted (step 62), the ongoing process of signaling processor 31 is aborted (step 65).

Returning to FIG. 3, if the terminating unit 16 of the IP node receives the grant indication message from the ATM node (step 48), the signaling processor 17 is notified of this fact and sets into the VC management table 19 the IP addresses of the source and destination IP nodes, source and destination TCP (UDP) port numbers and the VPI/VCI of the established virtual connection as well as the identifier of the source and destination network applications (step 49). the ATM terminating unit 16 will then receive data cells from the IP processor 13. If no grant indication message is transmitted from the ATM node within a specified interval, the terminating unit 16 communicates this fact to the signaling processor 17 to cause it to abort the connection setup procedure by simply terminating the routine.

If the decision at step 45 indicates that a virtual connection has already been established for a given pair of source and destination TCP (UDP) ports in response to receipt of a packet, the ATM terminating unit 16 looks up the corresponding entry of VC management table 19 (step 51) and determines whether or not the transmission of the packet over the established virtual connection is allowed (step 52). If the decision is affirmative at step 52, the packet is segmented into ATM cells and transmitted to the ATM network (step 53). Otherwise, the packet is discarded (step 54).

Figure 5:
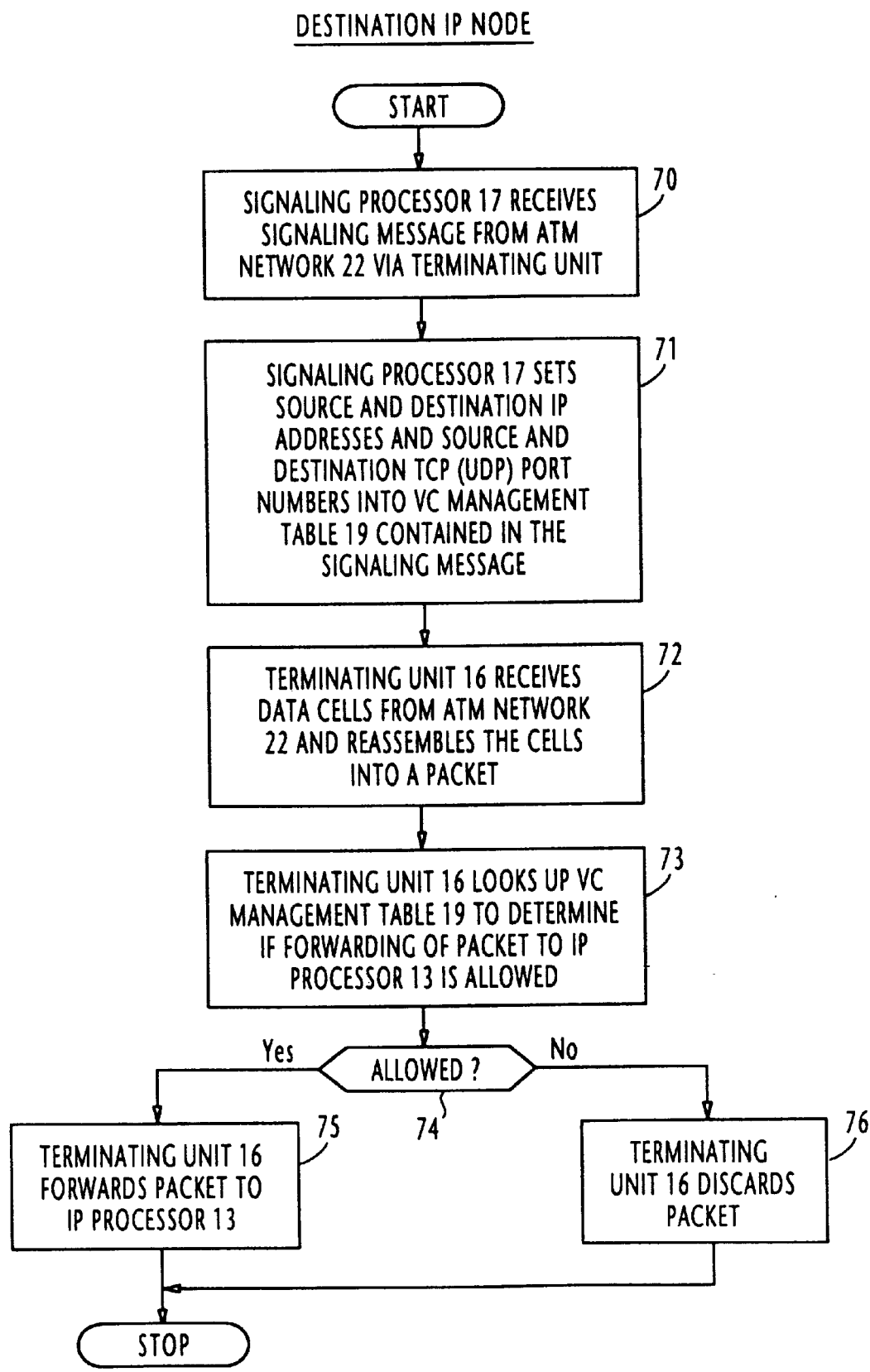
FIG. 5 is a flowchart of the operation of the IP node as a destination node during the connection setup and data transfer phases according to the first embodiment of this invention.

When the IP node receives a signaling message from the ATM node, it operates as a destination node according to the flowchart of FIG. 5. At the destination IP node, the signaling message from the ATM node is received by the signaling processor 17 via the terminating unit 16 (step 70). The signaling processor 17 sets the VC management table 19 with the source and destination IP addresses, the source and destination TCP (UDP) port numbers and the source and destination network application identifiers contained in the signaling message (step 71).

When the destination IP node subsequently receives data cells from the ATM node, the terminating unit 16 reassembles the received data cells into a packet (step 72) and then looks up the VC management table 19 to determine whether the address and port data of the packet matches the data stored in the corresponding entry of the table 19 (step 73). If they match, it is determined that the packet is allowed and the terminating unit 16 forwards the packet to the IP processor 13 (step 75). If they mismatch, the terminating unit 16 discards the packet (step 76).

It is seen from the foregoing that the signaling processor 31 of the ATM node stores network-layer (IP addresses) and transport-layer information (TCP/UDP port numbers) into the filtering table 33 in a manner similar to what conventional routers do for their routing table for limiting the use of virtual connections to authorized communication sources.

Upon receipt of a signaling message from a source IP node, the ATM node checks the network- and transport-layer information it contains against the information stored in the filtering table and determines whether a virtual connection is to be granted or not. The source IP node stores the network- and transport-layer information contained in the signaling message into the VC management table 19. When a virtual connection is granted for a given request, the source IP node performs a filtering process on every outgoing data packet by checking its network- and transport-layer information against the information stores in the corresponding entry of the VC management table 19. At the destination IP node, the network- and transport-layer information contained in the signaling message from the ATM node are stored into the VC management table 19 of the destination node and used as reference data for filtering data cells subsequently received from the ATM node.

As a result, the present invention enables packet filtering function to be performed at the network-layer and transport-layer levels in an Internet over ATM network. In addition, since the filtering data of an ATM node can be determined from the security standpoint of the network regardless of the virtual connection data of IP nodes, secure communication of all IP nodes located downstream of the ATM node can be ensured.

If a virtual connection is already established between two IP nodes, but not between desired port numbers, a connection setup message may be received, requesting that a virtual connection be additionally established between such port numbers. In this instance, an add-on signaling message can be used according to the flowcharts of FIGS. 6, 7 and 8.

Figure 6:
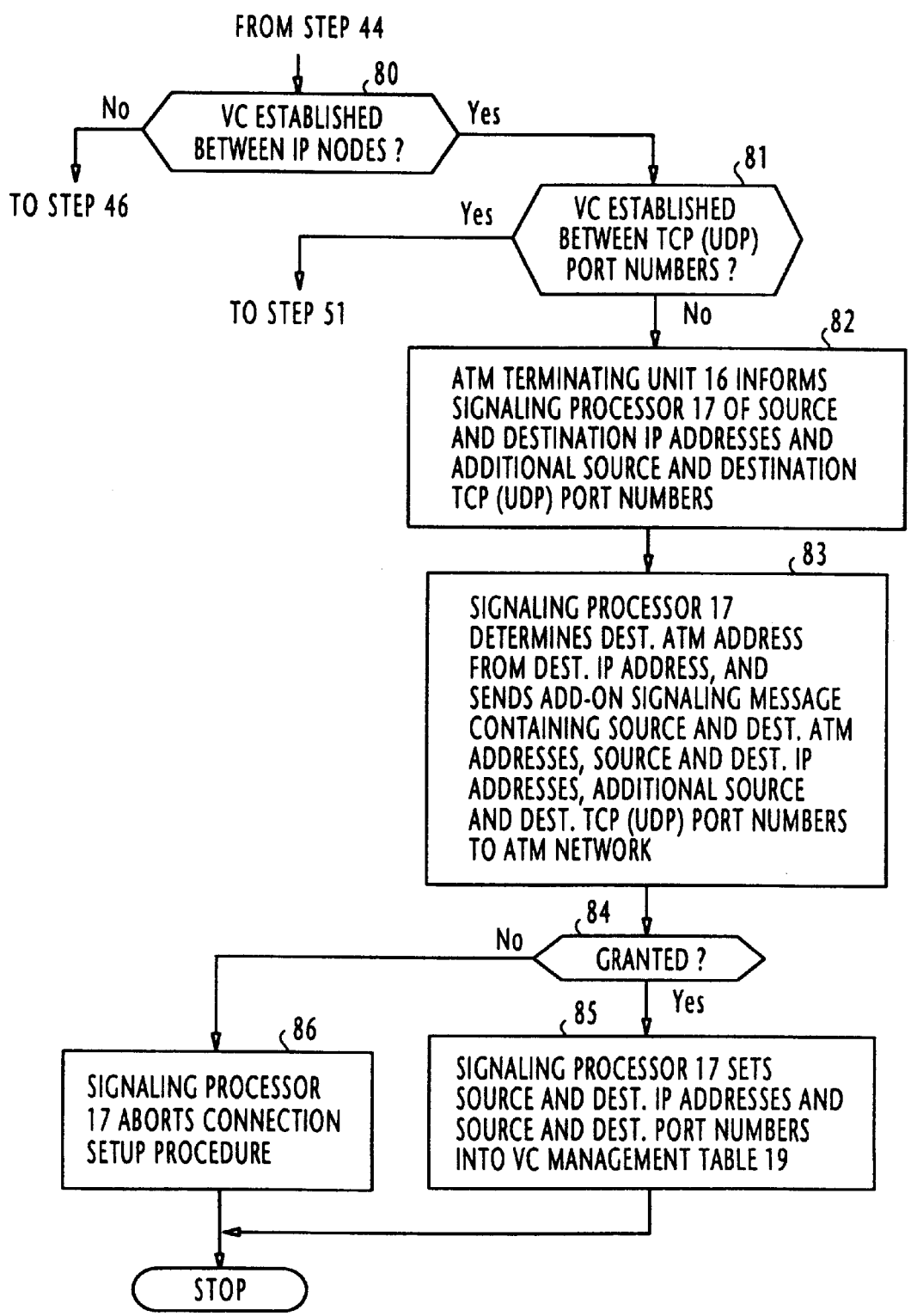
FIG. 6 is a flowchart of the operation of the IP node as a source node during connection setup and data transfer phases according to a second embodiment of this invention.

The flowchart of FIG. 6 illustrates the processes performed by the source IP node which are similar to those of FIG. 3. Therefore, in FIG. 6 parts corresponding to those in FIG. 3 are marked with the same numerals as those in FIG. 3, the description thereof being omitted for simplicity. Following the execution of step 44, the terminating unit 16 executes decision step 80 to determine whether a virtual connection is already established between the source IP node and a requested destination IP node. If the decision at step 80 is negative, step 46 is executed. Otherwise, the terminating unit executes decision step 81 to determine whether the virtual connection is established between desired TCP (UDP) port numbers. If it is, step 51 is executed. Otherwise, the terminating unit 16 proceeds to step 82 to inform the ATM signaling processor 17 of the IP addresses of source and destination IP nodes and additional TCP (UDP) port numbers along with the identifiers of network applications used at both source and destination.

Using the destination IP address, the ATM signaling processor 17 resolves the ATM address of the destination IP node and sends an add-on signaling message to the ATM network, containing the ATM addresses of the source and destination IP nodes, source and destination IP addresses and additional source and destination TCP (UDP) port numbers as well as the identifiers of the network applications used by both source and destination (step 83).

Figure 7:
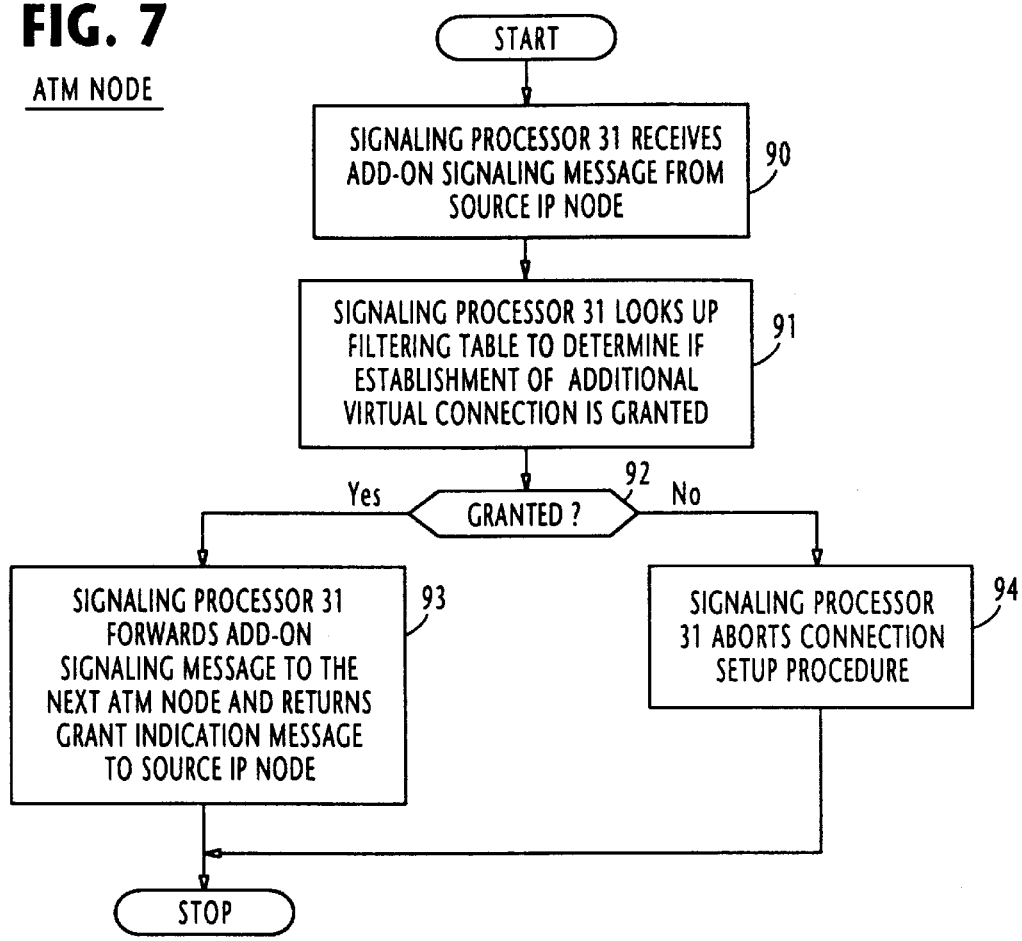
FIG. 7 is a flowchart of the operation of the ATM node during the connection setup phase according to the second embodiment of this invention.

At the ATM node, the signaling processor 31 receives this add-on signaling message from the source IP node (step 90) as shown in FIG. 7. The signaling processor 31 looks up, at step 91, the filtering table 33 to determine if the establishment of the requested virtual connection is to be granted or not. If the setup request is granted (step 92), the signaling processor 31 forwards the add-on signaling message to the next ATM node and returns a grant indication message to the source IP node (step 93). If the request is not granted (step 92), the on-going process of signaling processor 31 is aborted (step 94). Since the virtual connection between the two IP nodes has already been established and the outgoing link for this connection can be shared with the additional virtual connection, the ATM node is not required to search for an outgoing link in response to an add-on signaling message.

Returning to FIG. 6, if the terminating unit 16 of the IP node receives the grant indication message from the ATM node (step 84), the signaling processor 17 is notified of this fact and sets into the VC management table 19 the IP addresses of the source and destination IP nodes, the additional source and destination TCP (UDP) port numbers and the same VPI/VCI as that of the virtual connection already established between the source and destination IP nodes, as well as the identifiers of the source and destination IP nodes, as well as the identifiers of the source and destination network applications (step 86). The ATM terminating unit 16 will then receive data cells from the IP processor 13. If no grant indication message is transmitted from the ATM node within a specified interval, the terminating unit 16 communicates this fact to the signaling processor 17 to cause it to abort the connection setup procedure (step 85).

Figure 8:
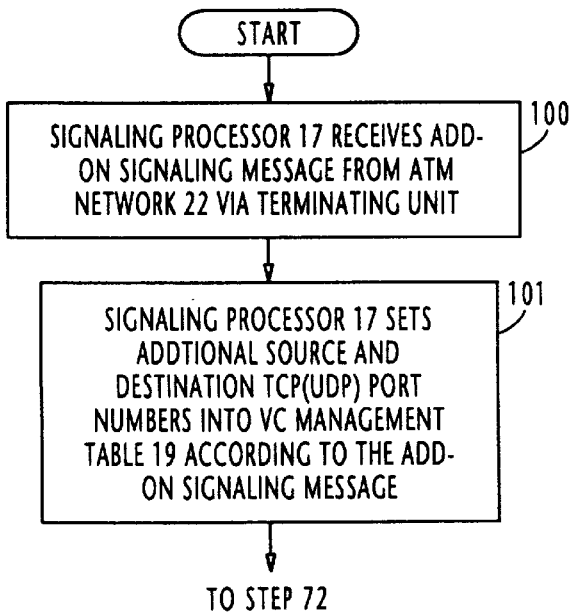
FIG. 8 is a flowchart of the operation of the IP node as a destination node during the connection setup and data transfer phases according to the second embodiment of this invention.

When the IP node receives a signaling message from the ATM node, it operates as a destination node according to the flowchart of FIG. 8. At the destination IP node, the add-on signaling message from the ATM node is received by the signaling processor 17 via the terminating unit 16 (step 100). The signaling processor 17 sets the VC management table 19 with the source and destination IP addresses, the additional source and destination TCP (UDP) port numbers and the source and destination network application identifiers contained in the signaling message (step 101). When the destination IP node subsequently receives data cells from the ATM node, the terminating unit 16 executes step 72 (FIG. 5).

The packet filtering function of the present invention can also be employed in a multiprotocol over ATM (known as MPOA) system as specified in the ATM Forum 96-0824r9.

As illustrated in FIG. 9, the MPOA system comprises an ATM network 110 in which a plurality of logical LANs, or subnets are formed. For simplicity, two subnets 111 and 112 are illustrated. MPOA clients, or MPCs 113 and 114 are connected to the ATM network 110. If MPC 113 wishes to communicate with MPC 114, the source MPC is designated as an ingress MPC as it is connected to an ingress point of the ATM network where the inbound flow enters the MPOA system and MPC 114 is designated as an egress MPC as it is connected to an egress point of the network where the outbound flow exits the MPOA system. MPOA servers, or MPSs 116 and 117 are respectively located in the subnets 111 and 112.

Briefly described, when the transmission rate of packets from the ingress MPC 113 to the egress MPC 114 is smaller than a predefined threshold, the ingress MPC 113 treats the packets as single-packet datagrams and forwards them through MPSs 116 and 117 to the destination. If the transmission rate of the packets exceeds the threshold, the MPC 113 treats them as a sequence of successive packets and establishes a shortcut virtual connection to the destination, bypassing the MPSs 116 and 117, and forwards the packets through the shortcut path.

When the packets are initially transmitted via the connectionless path as datagrams, MPSs 116 and 117 function as ingress and egress MPOS servers, respectively, and the ingress MPS 116 performs a filtering on incoming packets.

Details of each of the MPCs 113 and 114 are shown in FIG. 10. Each MPS has an ATM terminating unit 120 connected to the ATM network 110 to serve as an interface for performing packet segmentation and cell reassembly. An ATM signaling processor 131 is associated with the terminating unit 130 and a virtual connection (VC) management table 122 to perform signaling procedure (as defined in the ATM Forum UNI 3.1 or ITU-T Recommendation Q.2931) for establishing a virtual connection through the ATM network 110. A LAN emulation client (LEC) processor 123 is associated with the terminating unit 120 and VC management table 122 to transmit MAC (medium access layer control) frames to an LEC within the same subnet, using the LANE (LAN emulation) protocol. A MAC (MPOA client) processor 124 is associated with the terminating unit 120, VC management table 122, LEC processor 123 and a shortcut VC table 125. When the MPC is an ingress MPC, the MAC processor 124 performs an address resolution procedure by encapsulating an IP packet within a MAC frame and exchanging MAC frames with an MPOA server to establish a shortcut virtual connection to the egress MPC located within a subnet different from the subnet in which the ingress MPC is resident. The VC management table 122 performs management of established virtual connections. A non-ATM network interface 126 is connected between the MPC processor 124 and a non-ATM network, not shown.

The shortcut VC table 125 has a plurality of entries, the details of this table being shown in FIG. 11A when the MPC is operating as an ingress MPC and in FIG. 11B when it is operating as an egress MPC. Each entry of the shortcut VC table 125 for the ingress MPC has a destination MAC address field, a count field, a destination ATM address field, a VPI/VCI field, and a field for storing source and destination IP addresses and source and destination TCP/UDP port numbers. Each entry of the shortcut VC table 125 for the egress MPC has a source ATM address field, a destination IP address field, a VPI/VCI field, and a field for storing source and destination IP addresses and source and destination TCP/UDP port numbers.

Figure 12:
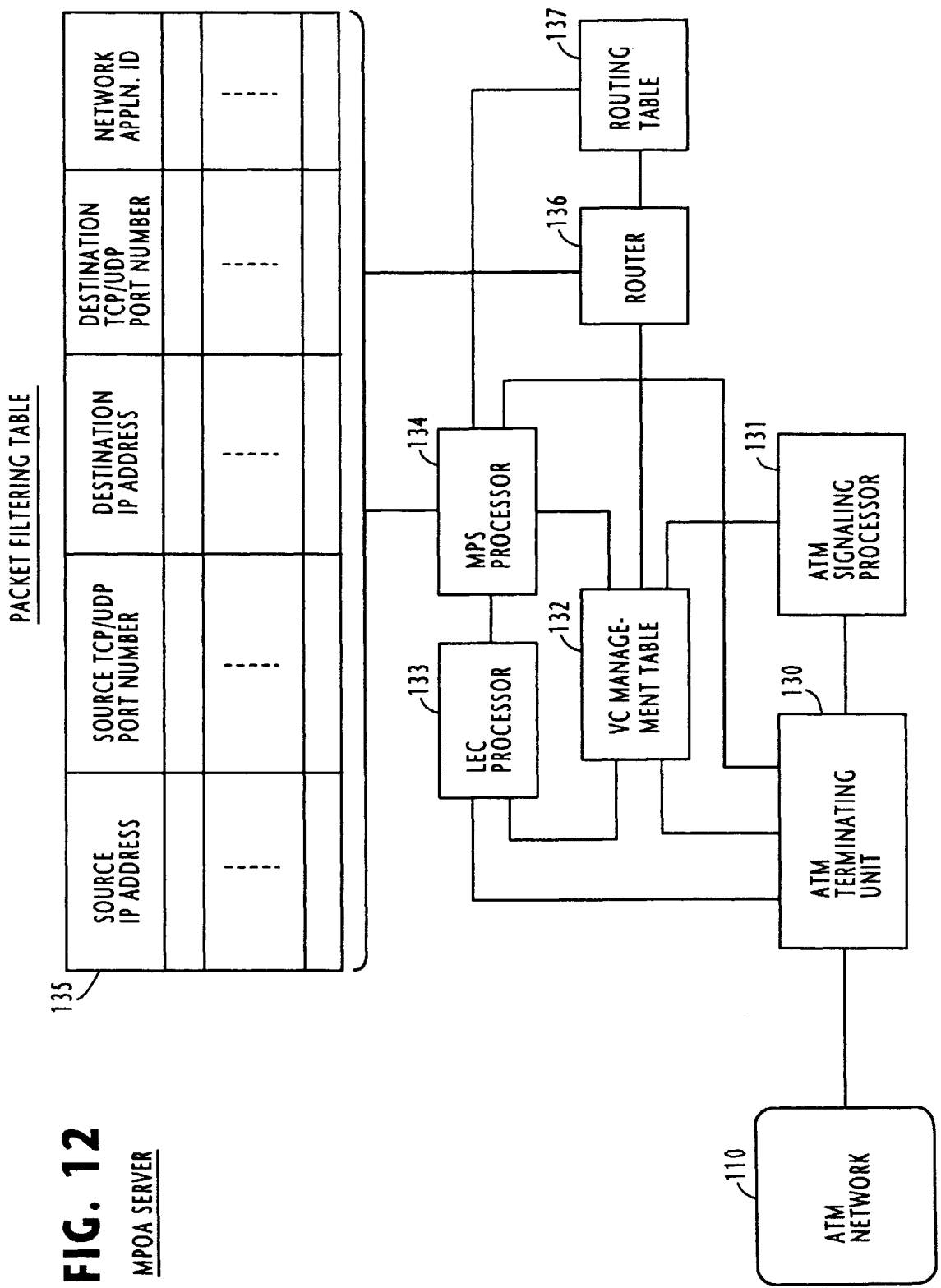
FIG. 12 is a block diagram of an MPS (MPOA server) of the MPOA system.

As shown in FIG. 12, each MPOA server is similar in configuration to the MPCs since it also comprises an ATM terminating unit 130, an ATM signaling processor 131, a VC management table 132 and a LEC processor 133. The MPS has a MPS processor 134, a packet filtering table 135, a router 136 and a routing table 137. The routing table 137 stores a plurality of routes for assisting the router 136 in finding an appropriate MPC and MPS within a subnet different than the subnet in which the own MPS is located. The MPS processor 134 is associated with the terminating unit 130, VC management table 132, LEC processor 133, packet filtering table 135 and routing table 137 for performing an address resolution to establish the shortcut VC between the ingress MPC and the egress MPC, using the MPOA protocol. Router 136 is associated with the VC management table 132, packet filtering table 135 and routing table 137 for forwarding IP packets received from another MPS or an MPC co-located in the same subnet with the own MPS to the next MPS or an MPC in a different subnet.

The packet filtering table 135 has a plurality of entries each being partitioned into a number of fields for setting a source IP address, a source TCP/UDP port number, a destination IP address, a destination TCP/UDP port number and a network application identifier.

The operation of the MPC processor at the ingress MPC (MPOA client) proceeds according to the flowcharts of FIGS. 13A to 13D.

Figure 13A:
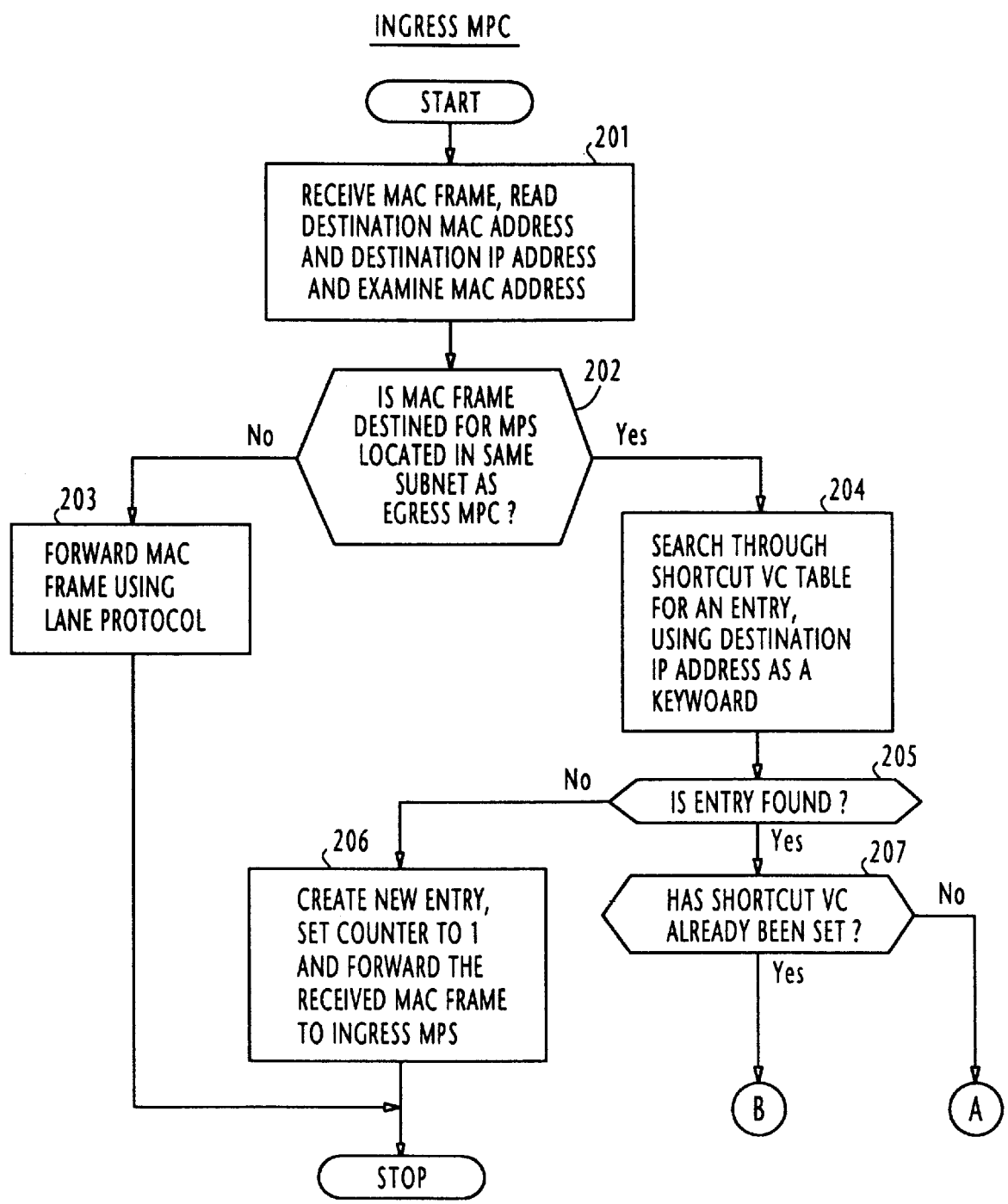
Figure 13C:
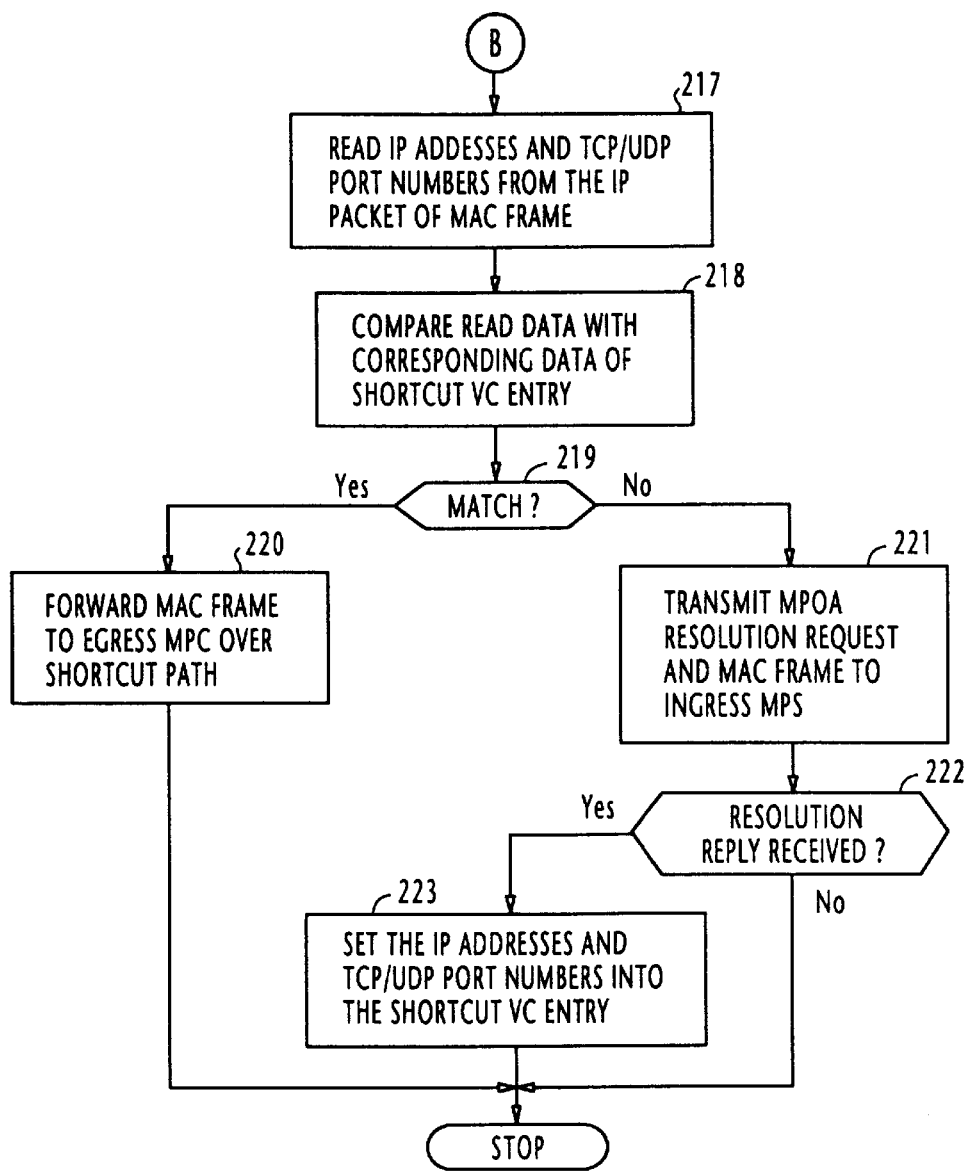

In FIG. 13A, when the MPC processor receives a MAC frame from outside of the ATM network, it reads the destination MAC address and destination IP address of the frame (step 201) and examines the MAC address to see if the MAC frame is destined for an ingress MPS (MPOA server) located in the same subnet as the egress (destination) MPC (step 202). If the decision is negative at step 202, flow proceeds to step 203 to forward the MAC frame to the destination node using the LANE (LAN emulation) protocol. If the decision at step 202 is affirmative, flow proceeds to step 204 to search through the shortcut VC table 125 for a corresponding entry, using the destination IP address as a keyword (see FIG. 11A). If such an entry is not found (step 205), the MPC processor 124 creates a new entry in the shortcut VC table 125 and sets the counter field to "1" and forwards the received MAC frame to the ingress MPS. If the decision at step 205 is affirmative, the MPC processor 124 proceeds to step 207 and determines whether the entry indicates that a shortcut virtual connection has already been set. If the decision is negative at step 207, flow proceeds to step 208 (FIG. 13B) to increment the count value (C) of the entry in the shortcut VC table by "1" and start a timer. At step 209, the count value C is compared with a predefined threshold value (T). If C is smaller than T, the MPC processor 124 recognizes that the traffic is a datagram and should be transmitted on a connectionless mode and terminates the process after forwarding the MAC frame to the ingress MPS at step 210.

If C is equal to or greater than T, the MPC processor 124, recognizing that the traffic is a continuous stream of packets and should be transmitted on a connection-oriented mode, proceeds to step 211 to read the source and destination IP addresses and source and destination TCP/UDP port numbers of the IP packet in the MAC frame, and forwards the IP packet to the ingress MPOA server. In order to obtain the ATM address of the egress MPC, the MPC processor 124 uses the read address and port number data to formulate a MPOA resolution request message and transmits the request message to the ingress MPS (step 212). If the address resolution process is successful, the ATM address of the egress MPC is returned with a resolution reply (grant indication) message indicating that permission for the establishment of a shortcut virtual connection is granted.

If a grant indication message is received from the ingress MPS (step 213), the ingress MPC reads the ATM address of the egress MPC from the reply message and sets into the entry of the shortcut VC table 125 the read ATM address and the source and destination address and TCP/UDP port numbers of a packet to be forwarded (step 214). If no grant indication message is received within a predetermined interval, the ingress MPC recognizes that the establishment of a shortcut VC is not granted and proceeds to the end of the routine.

Using the ATM address of the egress MPC, the signaling processor of the ingress MPC performs a signaling procedure and determines VPI/VCI values for a shortcut virtual connection (step 215), and the MPC processor 124 sets the VPI/VCI values into the entry of the shortcut VC table 125 (step 216) and terminates the process.

Returning to FIG. 13A, if the decision at step 207 is affirmative, indicating that a shortcut VC has already been set in an entry of the shortcut VC table, flow proceeds to step 217 (FIG. 13C) to read the source and destination IP addresses and source and destination TCP/UDP port numbers from the IP packet of the MAC frame. At step 218, the MPC processor 124 compares the read data items with corresponding data items in the entry of the established shortcut VC table.

If they match (step 219), the MPC processor forwards the MAC frame to the egress MPC over the established shortcut VC path (step 220) and terminates the routine. If the decision is negative at step 219, the MPC processor formulates a MPOA resolution request message with the IP addresses and TCP/UDP port numbers which are read at step 217 and transmits the message to the ingress MPS to obtain the ATM address of the egress MCP (step 221). If the address resolution is successful, an MPOA resolution reply message will be returned. If the MPC processor 124 receives the resolution reply message at step 222, it additionally sets the IP addresses and TCP/UDP port numbers which are read at step 217 into the shortcut VC entry as add-on address data for a packet to be forwarded, and terminates the routine. If no resolution reply is received, the decision at step 222 is negative and the MPC processor terminates the routine, recognizing that permission to set add-on address data into the already establishes shortcut VC entry is not allowed.

Figure 13D:
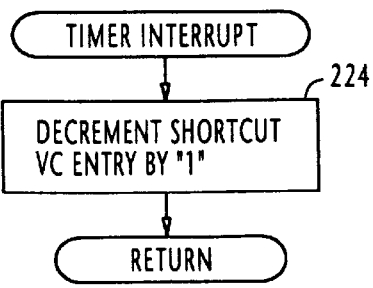

If packets are received in succession, the timer is restarted at step 208 upon receipt of each packet and the count value in the shortcut VC entry is increased. However, if the timer has run out before a subsequent packet arrives, the count value is decremented by "1" step 224 as shown in FIG. 13D.

The operation of the MPS processor 134 of an MPOA server proceeds as shown in the flowchart of FIG. 14. When the MPC processor 134 receives a MPOA resolution request message from the ingress MPS (step 301), it proceeds to read the IP addresses and TCP/UDP port numbers the request message contains (step 302). The MPS processor 134 examines the packet filtering table and determines if the forwarding of the packet associated with the resolution request message is allowed (step 304).

If the decision is affirmative at step 304, flow proceeds to step 305 to discard the MPOA resolution request message to abort the establishment of a shortcut virtual connection and terminates the routine. If the decision at step 304 is affirmative, flow proceeds to step 306 where the MPS processor causes the router to search through the routing table for an egress MPS, using the destination IP address. The MPS processor checks, at step 307, to see if the egress MPC is within the same subnet as this MPOA server.

If the answer is negative at step 307, the MPS processor proceeds to step 308 to formulate a NHRP (next hop resolution protocol) resolution request message with the IP addresses and TCP/UDP port numbers which are read at step 302 and transmits the request message to the next NHRP server, and terminates the routine. If the answer is affirmative at step 307, the MPS processor proceeds to step 309, where it formulates and transmits a cache imposition message to the egress MPC in order to obtain the ATM address of the egree MPC. This cache imposition message contains the ingress MPC ATM address, the egress MPS MAC address, the destination and destination TCP/UDP port numbers. The MPS processor proceeds to IP MAC address, the source and destination IP addresses, and the source and destination TCP/UDP port numbers. The MPS processor proceeds to step 310 to formulate and transmit a MPOA resolution reply message to the ingress MPC, containing the ATM address of the egress MPC, and then terminates the routine.

The operation of the egress MPOA client 114 proceeds according to the flowchart of FIG. 15 when it receives an MPOA cache imposition message from the egress MPS (step 401). The egress MPC processor reads, at step 402, the source (ingress MPC) ATM address, egress MPS MAC address, destination IP MAC address, source and destination IP addresses, and source and destination TCP/UDP port numbers, which the received cache imposition message contains. The MPC processor 124 of the egress MPC makes a search through the shortcut VC table 125 for an entry, using the source (ingress MPC) ATM address and destination IP address as a keyword (see FIG. 11B).

If a corresponding entry is not found (step 404), flow proceeds to step 405 to create a new entry in the shortcut VC table 125 and set the new entry with the source and destination IP addresses, source and destination TCP/UD port numbers, source (ingress MPC) ATM address, egress MPS MAC address and destination IP MAC address. The MPC processor 124 invokes an ATM signaling procedure, at step 406, to obtain VPI/VCI values and sets them into the new entry, returns a message containing the ATM address of the egress MPC to the egress MPS, and terminates the routine. If a corresponding entry is found (step 404), flow proceeds to step 307 to add the source and destination IP addresses and source and destination TCP/UDP port numbers to that entry, and terminates the routine.

The egress MCP 114 operates according to the flowchart of FIG. 16 when it receives ATM cells via a shortcut path. The received ATM cells are reassembled by the terminating unit into an IP packet (step 501). At step 502, the egress MPS processor makes a search through the shortcut VC table for an entry, using VPI/VCI and destination IP address as a keyword (see FIG. 11B). The egress MPC processor, at step 503, reads the source and destination IP addresses and source and destination TCP/UDP port numbers from the IP packet and compares, at step 504, the read data items with corresponding data items in the shortcut VC entry which was detected at step 502. If they match (step 505), the egress MPC processor formulates a MAC frame with the MAC address of MPS within the same subnet as the egress MPC and the destination IP MAC address and forwards the MAC frame to a non-ATM network, and terminates the routine. If they mismatch (step 505), the MPC processor terminates the routine after discarding the packet (step 507).

What is claimed is:

1. A communication system comprising:
    a source node for receiving a packet and transmitting a signaling message containing source and destination network-layer addresses and source and destination transport-layer addresses of said packet, said source node having a virtual connection management table; and
    an ATM network including a filtering table having a plurality of entries each storing source and destination network-layer addresses and source and destination transport-layer addresses, the ATM network receiving the signaling message from said source node and transmitting a grant indication message thereto if contents of the received signaling message are identical to contents of one of said entries of said filtering table, and establishing a virtual connection between the source node and a destination node,
    said source node being responsive to said grant indication message for storing the network-layer addresses and transport-layer addresses of said packet into said virtual connection management table, segmenting a subsequently received packet into cells and transmitting the cells over the virtual connection if the packet contains addresses identical to the addresses stored in said virtual connection management table.

2. A communication system as claimed in claim 1, wherein said ATM network is arranged to:
    transmit a signaling message to said destination node containing source and destination network-layer addresses and source and destination transport-layer addresses,
    said destination node comprises a virtual connection management table and is arranged to:
      store the addresses of said signaling message from the ATM network into the virtual connection management table, and
      receive cells from the ATM network and reassembles the cells into a packet only if the packet contains addresses identical to the addresses stored in the virtual connection management table.

3. A communication system as claimed in claim 1, wherein said source node is arranged to:
    transmit an add-on signaling message to the ATM network, containing additional source and destination transport-layer addresses if a virtual connection has already been established for a set of source and destination network-layer addresses,
    wherein said ATM network is arranged to:
      transmit back a grant indication message to the source node if the filtering table contains source and destination transport-layer addresses identical to the additional source and destination transport-layer addresses of the add-on signaling message,
      said source node being responsive to the grant indication message for storing the additional source and destination transport-layer addresses of said add-on signaling message into said virtual connection management table.

4. A communication system as claimed in claim 3, wherein said ATM network is arranged to:
    transmit an add-on signaling message to said destination node containing additional source and destination transport-layer addresses,
    said destination node is arranged to:
      store the additional addresses of said add-on signaling message from the ATM network into the virtual connection management table thereof.

5. A communication system as claimed in claim 1, wherein said source and destination network-layer addresses are IP (Internet protocol) addresses and said source and destination transport-layer addresses are TCP (transmission control protocol) addresses or UDP (user datagram protocol) addresses.

6. A multiprotocol over ATM (MPOA) system comprising:

an MPOA client comprising a shortcut virtual connection (VC) table having a plurality of entries, the MPOA client receiving a packet and transmitting an address resolution request message containing source and destination network-layer addresses and source and destination transport-layer addresses of said packet; and an MPOA server comprising a filtering table having a plurality of entries each storing source and destination network-layer addresses and source and destination transport-layer addresses, the MPOA server being responsive to said address resolution request message for transmitting a resolution reply message back to the MPOA client containing an ATM address of a destination if contents of the resolution request message are identical to contents of one of said entries of said filtering table, said MPOA client being responsive to said resolution reply message for storing the ATM address of the reply message and the network-layer addresses and transport-layer addresses of said packet into said shortcut VC table to establish a shortcut virtual connection to the destination, and forwarding a subsequently received packet over the shortcut virtual connection if the packet has addresses identical to contents of one of the entries of said shortcut VC table.

7. An MPOA system as claimed in claim 6, wherein said MPOA client is arranged to:

make a search through the shortcut VC table for an entry corresponding to the received packet, if said entry is found, increment a count value of said entry by a predetermined amount if the corresponding entry is found in said table, comparing the incremented count value with a predefined threshold, and forwarding the packet toward a destination as connectionless traffic if the count value is smaller than the threshold, transmit said address resolution request message if the count value is greater than said threshold, decrement said count value by said predetermined amount if no packet is received for a preset interval following receipt of a packet, if said entry is not found, create a new entry in said shortcut VC table.

8. An MPOA system as claimed in claim 6, wherein said MPOA server is arranged to:

formulate and transmit a cache imposition message to a destination MPOA client in response to said address resolution request message, wherein said destination MPOA client comprises a shortcut VC table having a plurality of entries, and is arranged to:

store contents of said cache imposition message in one of said entries of the shortcut VC table, and receive a packet via said shortcut virtual connection if contents of the packet are identical to contents of one of said entries of the shortcut VC table.

9. A method of communication over an ATM network, the method comprising the steps of:

a) creating, within said ATM network, a plurality of entries in a filtering table, each of the entries storing source and destination network-layer addresses and source and destination transport-layer addresses;

b) receiving, at a source node, a packet and transmitting a signaling message containing source and destination network-layer addresses and source and destination transport-layer addresses of said packet;

c) receiving, at the ATM network, the signaling message from said source node and transmitting a grant indication message thereto if contents of the received signaling message are identical to contents of one of said entries of the filtering table, and establishing a virtual connection between the source node and a destination node;

d) sorting, at the source node, the network-layer addresses and transport-layer addresses of said packet into a virtual connection management table in response to said grant indication message; and e) segmenting, at the source node, a subsequently received packet into cells and transmitting the cells over the virtual connection if the packet contains addresses identical to the addresses stored in said virtual connection management table.

10. The method of claim 9, wherein step (c) comprises the step of:

transmitting a signaling message to said destination node containing source and destination network-layer addresses and source and destination transport-layer addresses, further comprising the steps of:

storing, at the destination node, the addresses of said signaling message from the ATM network into a virtual connection management table, and receiving, at the destination node, cells from the ATM network and reassembling the cells into a packet only if the packet contains addresses identical to the addresses stored in the virtual connection management table.

11. The method of claim 9, further comprising the steps of:

transmitting, from the source node, an add-on signaling message to the ATM network, containing additional source and destination transport-layer addresses if a virtual connection has already been established for a set of source and destination network-layer addresses, transmitting back from the ATM network an additional grant indication message to the source node if the filtering table contains source and destination transport-layer addresses identical to the additional source and destination transport-layer addresses of the add-on signaling message, responsive to the grant indication message, storing, at the source node, the additional source and destination transport-layer addresses of said add-on signaling message into the virtual connection management table.

12. The method of claim 11, further comprising the steps of:

transmitting, from the ATM node, an add-on signaling message to said destination node containing additional source and destination transport-layer addresses;

storing, at the destination IP node, the additional addresses of said add-on signaling message form the ATM network into the virtual connection management table thereof.

13. A method of multiprotocol communication over an ATM network, comprising the steps of:

a) creating, at an MPOA client, a shortcut virtual connection (VC) table having a plurality of entries;

b) creating, at an MPOA server, a filtering table having a plurality of entries each storing source and destination network-layer addresses and source and destination transport-layer addresses;

c) receiving, at the MPOA client, a packet and transmitting, from the MPOA client, an address resolution request message containing source and destination network-layer addresses and source and destination transport-layer addresses of said packet;

d) receiving, at the MPOA server, said address resolution request message and returning a resolution reply message to the MPOA client containing an ATM address of a destination if content of the resolution request message are identical to contents of one of said entries of said filtering table;

e) receiving, at the MPOA client, said resolution reply message and storing the ATM address of the reply message and the network-layer addresses and transport-layer addresses of said packet into said shortcut VC table to establish a shortcut virtual connection to the destination; and f) forwarding, from the MPOA client, a subsequently received packet over the shortcut virtual connection if the packet has addresses identical to contents of one of the entries of said shortcut VC table.

14. The method of claim 13, further comprising the steps of:

making a search, at the MPOA client, through the shortcut VC table for an entry corresponding to the received packet;

incrementing, at said MPOA client, a count value of said entry by a predetermined amount if said entry is found in said table;

comparing, at said MPOA client, the incremented count value with a predefined threshold;

forwarding from said MPOA client a received packet as connectionless traffic if the count value is smaller than the threshold;

transmitting from said MPOA client said address resolution request message if the count value is greater than said threshold; and decrementing, at said MPOA client, said count value by said predetermined amount if no packet is received for a preset interval following receipt of a packet.

15. The method of claim 13, further comprising the steps of:

formulating, at the MPOA server, a cache imposition message and transmitting the message to a destination MPOA client in response to said address resolution request message, creating, at the destination MPOA client, a shortcut VC table having a plurality of entries;

storing, at the destination MPOA client, contents of said cache imposition message in one of said entries of the shortcut VC table, and receiving, at the destination MPOA client, a packet via said shortcut virtual connection if contents of the packet are identical to contents of one of said entries of the shortcut VC table.

* * * * *